(12) United States Patent
Williamson et al.

(10) Patent No.: US 10,959,083 B2
(45) Date of Patent: Mar. 23, 2021

(54) APPLICATION LEVEL USAGE BASED OPTIMIZATION

(71) Applicant: vMOX, LLC, Roslyn Heights, NY (US)

(72) Inventors: Matthew Williamson, La Porte, IN (US); David Gardner, Great Neck, NY (US); Richard Siebels, Lebanon, PA (US)

(73) Assignee: VMOX, LLC, Port Washington, NY (US)

( * ) Notice: Subject to any disclaimer, the term of this patent is extended or adjusted under 35 U.S.C. 154(b) by 0 days.

(21) Appl. No.: 16/431,614

(22) Filed: Jun. 4, 2019

(65) Prior Publication Data

US 2020/0045531 A1 Feb. 6, 2020

Related U.S. Application Data (60) Provisional application No. 62/715,187, filed on Aug. 6, 2018.

(51) Int. Cl.
*H04W 8/18* (2009.01)
*H04W 4/50* (2018.01)
*H04W 24/08* (2009.01)

(52) U.S. Cl.
CPC ............... *H04W 8/18* (2013.01); *H04W 4/50* (2018.02); *H04W 24/08* (2013.01)

(58) Field of Classification Search
CPC .......... H04W 8/18; H04W 4/50; H04W 24/08
See application file for complete search history.

(56) References Cited

U.S. PATENT DOCUMENTS

| | | | |
|---|---|---|---|
| 7,486,944 B2 | 2/2009 | Carpenter et al. | |
| 7,986,936 B2 | 7/2011 | Zulager et al. | |
| 8,422,988 B1 | 4/2013 | Keshav | |
| 9,860,368 B2 | 1/2018 | Aggarwal et al. | |
| 10,033,879 B1 | 7/2018 | Siebels et al. | |
| 10,462,306 B1 | 10/2019 | Siebels et al. | |
| 2002/0115447 A1* | 8/2002 | Martin | G06Q 20/202 455/456.3 |
| 2011/0086610 A1 | 4/2011 | Baldwin et al. | |
| 2012/0302204 A1 | 11/2012 | Gupta et al. | |
| 2013/0132854 A1* | 5/2013 | Raleigh | H04W 4/60 715/738 |
| 2015/0071068 A1* | 3/2015 | Gupta | H04W 8/18 370/235 |
| 2017/0201850 A1 | 7/2017 | Raleigh et al. | |

* cited by examiner

*Primary Examiner* — Joseph E Dean, Jr.
(74) *Attorney, Agent, or Firm* — Carr & Ferrell LLP (57) ABSTRACT

In some embodiments, the present disclosure is directed to a method that comprises: (a) identifying and storing dedicated preferred access agreements between application service providers and telecommunication service providers; (b) capturing and analyzing application service provider subscriber usage for defined service applications; and (c) automating purchase or removal of telecommunication service provider features for identified subscribers based on the preferred access agreements and the analyzing of the application service provider subscriber usage.

18 Claims, 10 Drawing Sheets

APPLICATION LEVEL USAGE BASED OPTIMIZATION

CROSS REFERENCE TO RELATED APPLICATIONS

The present application claims the priority benefit of U.S. Provisional Patent Application Ser. No. 62/715,187 filed on Aug. 6, 2018 and titled "Application Level Usage Based Optimization," which is hereby incorporated by reference in its entirety.

FIELD OF THE PRESENT TECHNOLOGY

The present disclosure relates to optimization of application usage.

SUMMARY

In some embodiments the present disclosure is directed to a method that comprises: (a) identifying and storing dedicated preferred access agreements between application service providers and telecommunication service providers; (b) capturing and analyzing application service provider subscriber usage for defined service applications; and (c) automating purchase or removal of telecommunication service provider features for identified subscribers based on the preferred access agreements and the analyzing of the application service provider subscriber usage.

In various embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One aspect includes a method, the method including: identifying and storing dedicated preferred access agreements between application service providers and telecommunication service providers; collecting preferred access agreements between the telecommunication service providers and the application service providers; categorizing the preferred access agreements by service type; and storing the preferred access agreement in a database. In various embodiments, the database is a relational database.

In some embodiments the present disclosure is directed to a method that comprises: (a) capturing and analyzing application service provider subscriber usage for defined service applications; (b) collecting application level usage by period and subscriber end point; (c) analyzing the application level usage and identifying relevant telecommunication service provider features; and (d) calculating an optimal telecommunication service provider feature combination.

In various embodiments the present disclosure is directed to a method that comprises: (a) automating purchase or removal of telecommunication service provider features for identified subscribers; (b) comparing collected usage categorization against stored preferred access agreements between application service providers and telecommunication service providers; (c) building recommendations to add or remove telecommunication service provider features to align end point usage consumption with preferred access features; (d) aggregating the recommendations by the end point usage consumption; and (e) submitting built recommendations to the telecommunication service providers for fulfillment.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIGS. 5, 6, and 7 depict a flowchart of data flow according to various embodiments of the present technology.

DETAILED DESCRIPTION

Generally speaking, the present disclosure is directed, in some embodiments, to systems and methods that allow for optimization of telecommunication service plans for a group of subscribers, based on application level usage by subscribers in the group. For example, in some embodiments, a subscriber plan may be optimized based on subscriber usage of specific applications and telecommunication service provider features (or plans) offered by the telecommunication service provider for providing content specific to an application to the subscriber. In some instances, optimization is accomplished by purchase or removal of telecommunication service provider features (i.e., plans specific to an application provider) for identified subscribers based on usage of the specific application.

These and other advantages of the present disclosure are disclosed in greater detail herein with reference to the collective drawings.

Figure 1:
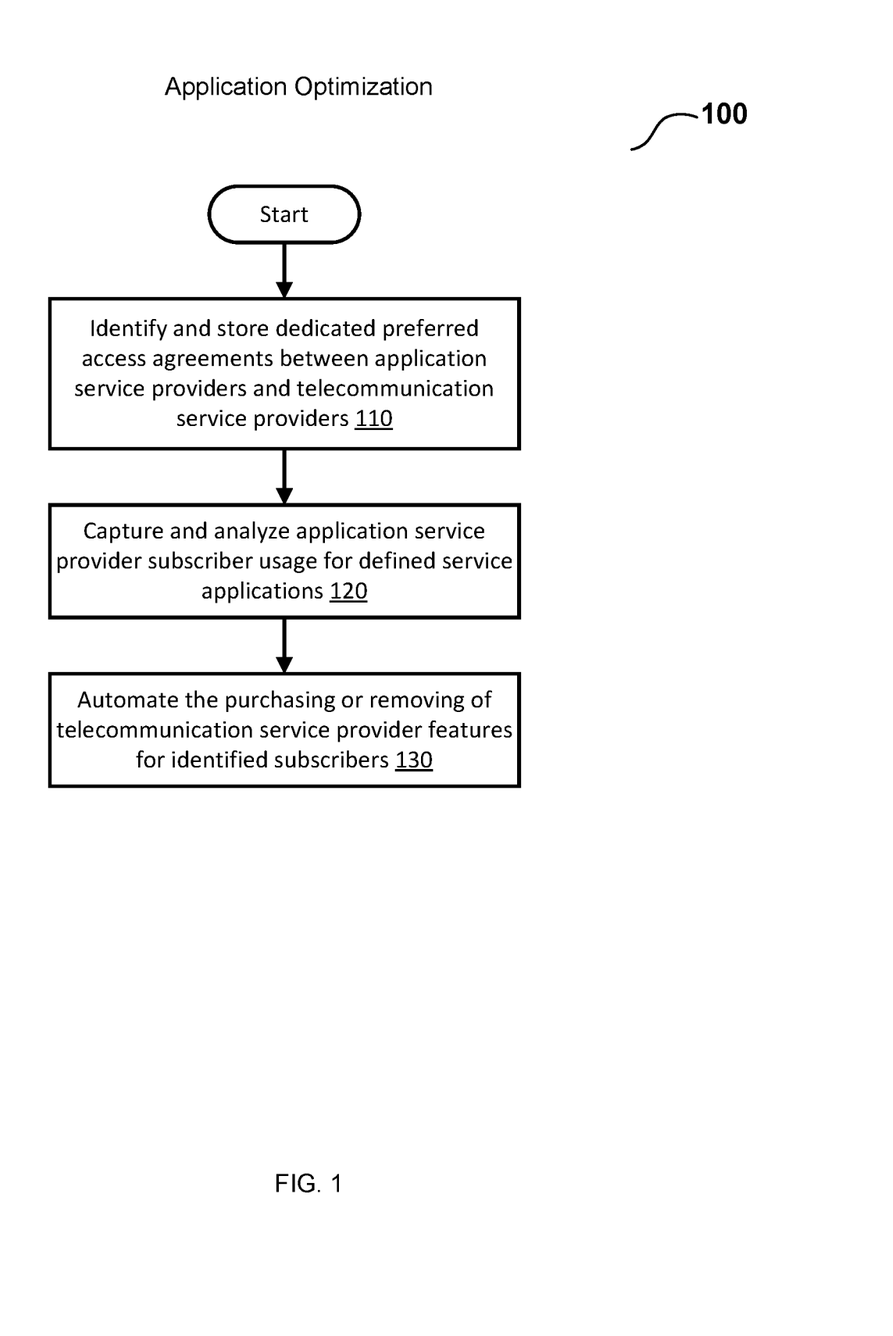
FIG. 1 illustrates a flowchart of an exemplary method for application optimization that is executed according to various embodiments of the present technology.

FIG. 1 illustrates a flowchart of an exemplary method for application optimization 100 that is executed according to various embodiments of the present technology. For example, the method includes: identifying and storing dedicated preferred access agreements between application service providers and telecommunication service providers 110; capturing and analyzing application service provider subscriber usage for defined service applications 120; and automating purchase or removal of telecommunication service provider features for identified subscribers based on the preferred access agreements and the analyzing of the application service provider subscriber usage 130.

Figure 2:
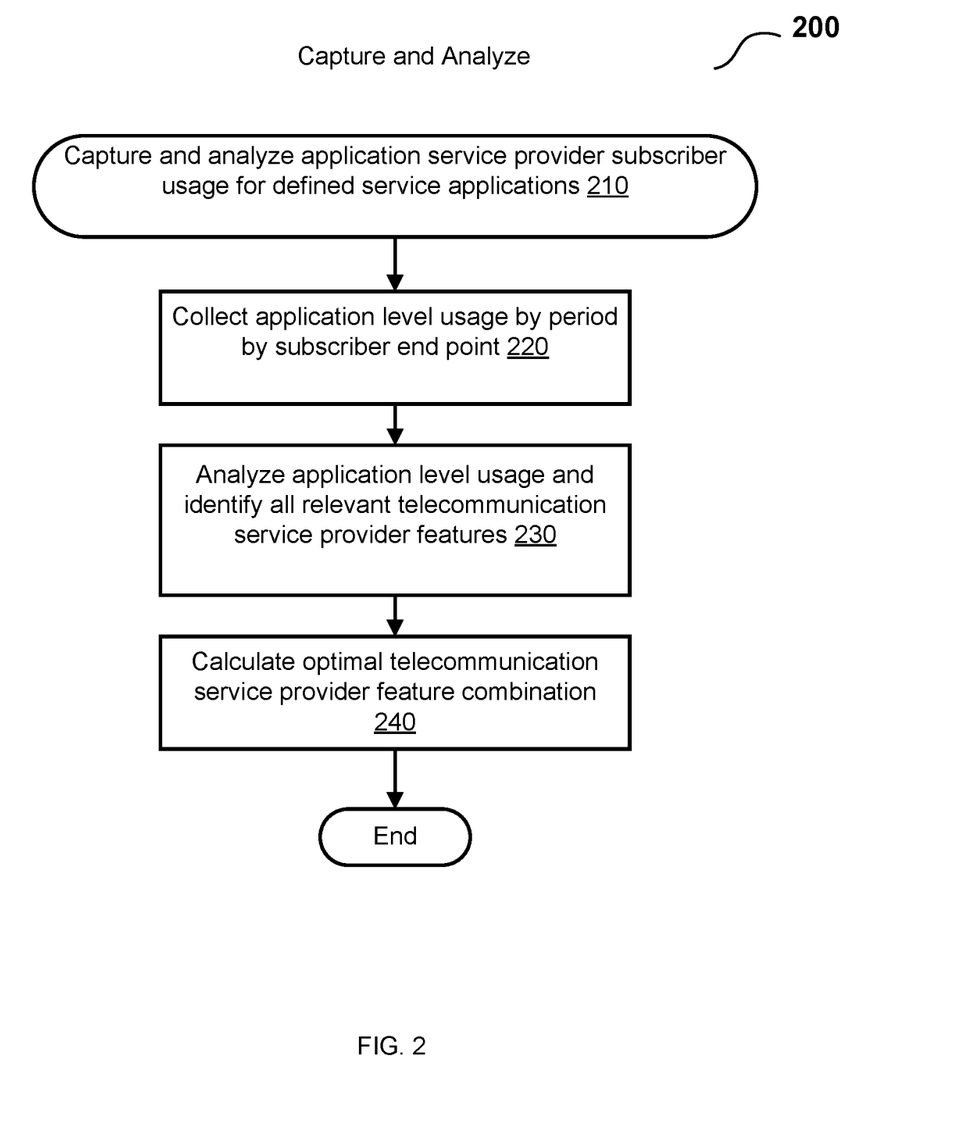
FIG. 2 illustrates an exemplary method for capturing and analyzing subscriber data usage according to various embodiments of the present technology.

FIG. 2 illustrates an exemplary method for capturing and analyzing subscriber data usage 200 according to various embodiments of the present technology. In some embodiments, the method includes capturing and analyzing application service provider subscriber usage for defined service applications 210; collecting application level usage by period and subscriber end point 220; analyzing the application level usage and identifying relevant telecommunication service provider features 230; and calculating an optimal telecommunication service provider feature combination 240.

Figure 3:
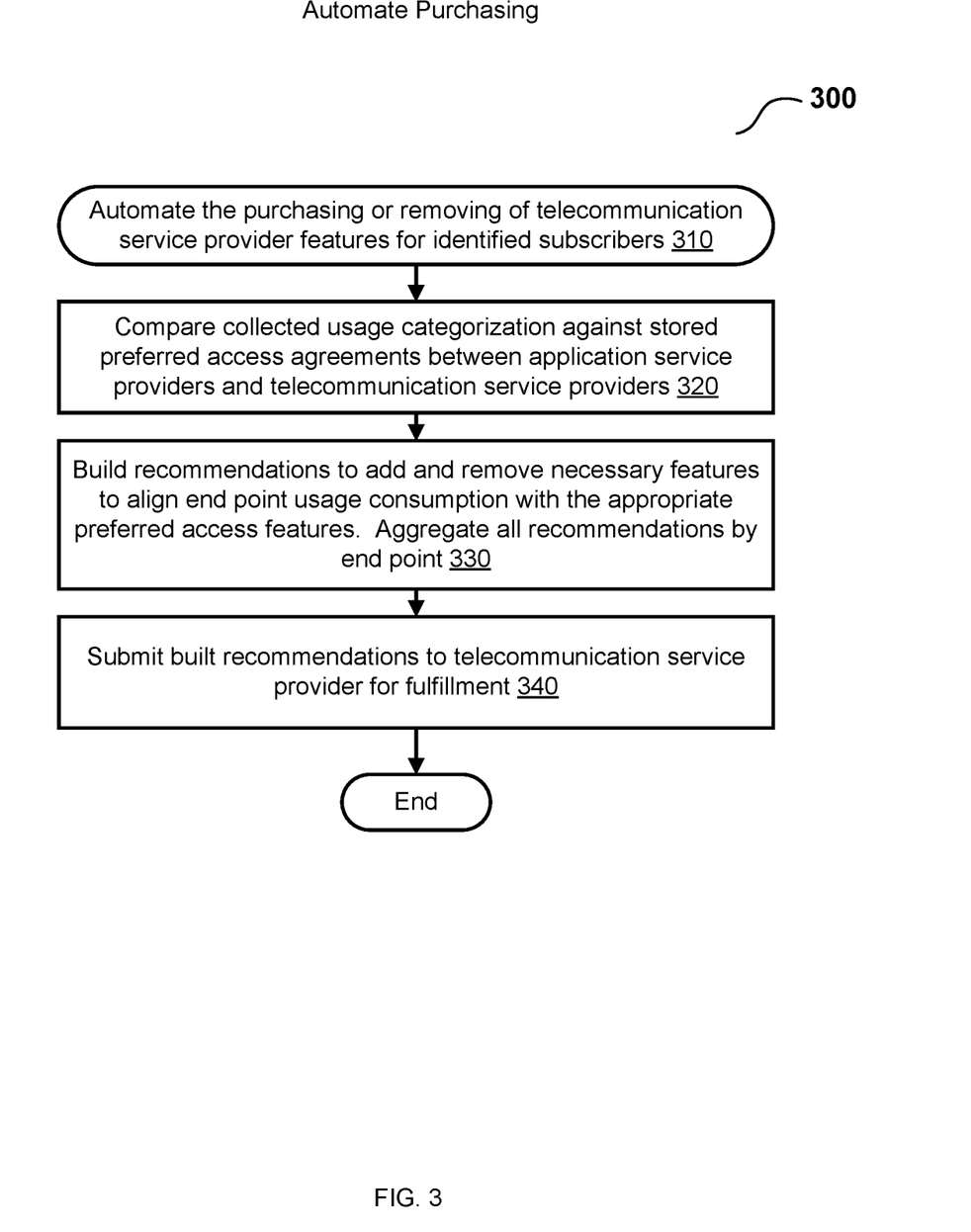
FIG. 3 illustrates an exemplary method for automating the purchase of features according to various embodiments of the present technology.

FIG. 3 illustrates an exemplary method for automating the purchase of features 300 according to various embodiments of the present technology. In various embodiments the method includes automating purchase or removal of telecommunication service provider features for identified subscribers 310; comparing collected usage categorization against stored preferred access agreements between application service providers and telecommunication service providers 320; building recommendations to add or remove telecommunication service provider features to align end point usage consumption with preferred access features; aggregating the recommendations by the end point usage consumption 330; and submitting built recommendations to the telecommunication service providers for fulfillment 340.

Figure 4:
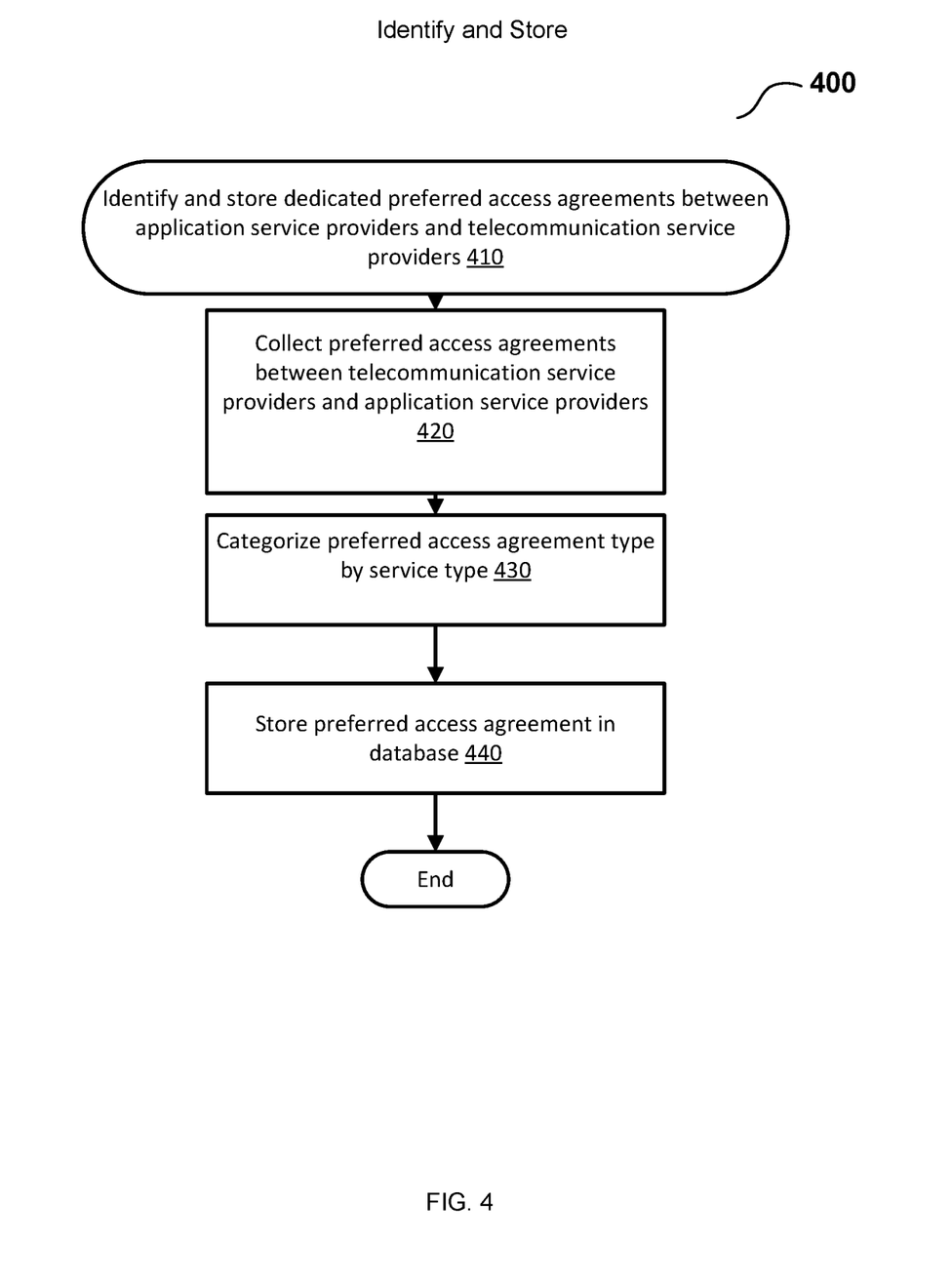
FIG. 4 illustrates an exemplary method for identifying and storing agreements according to various embodiments of the present technology.

FIG. 4 illustrates an exemplary method for identifying and storing agreements 400 according to various embodiments of the present technology. In various embodiments the method includes identifying and storing dedicated preferred access agreements between application service providers and telecommunication service providers 410; collecting preferred access agreements between the telecommunication service providers and the application service providers 420; categorizing the preferred access agreements by service type 430; and storing the preferred access agreement in a database 440. In various embodiments, the database is a relational database.

Figure 5:
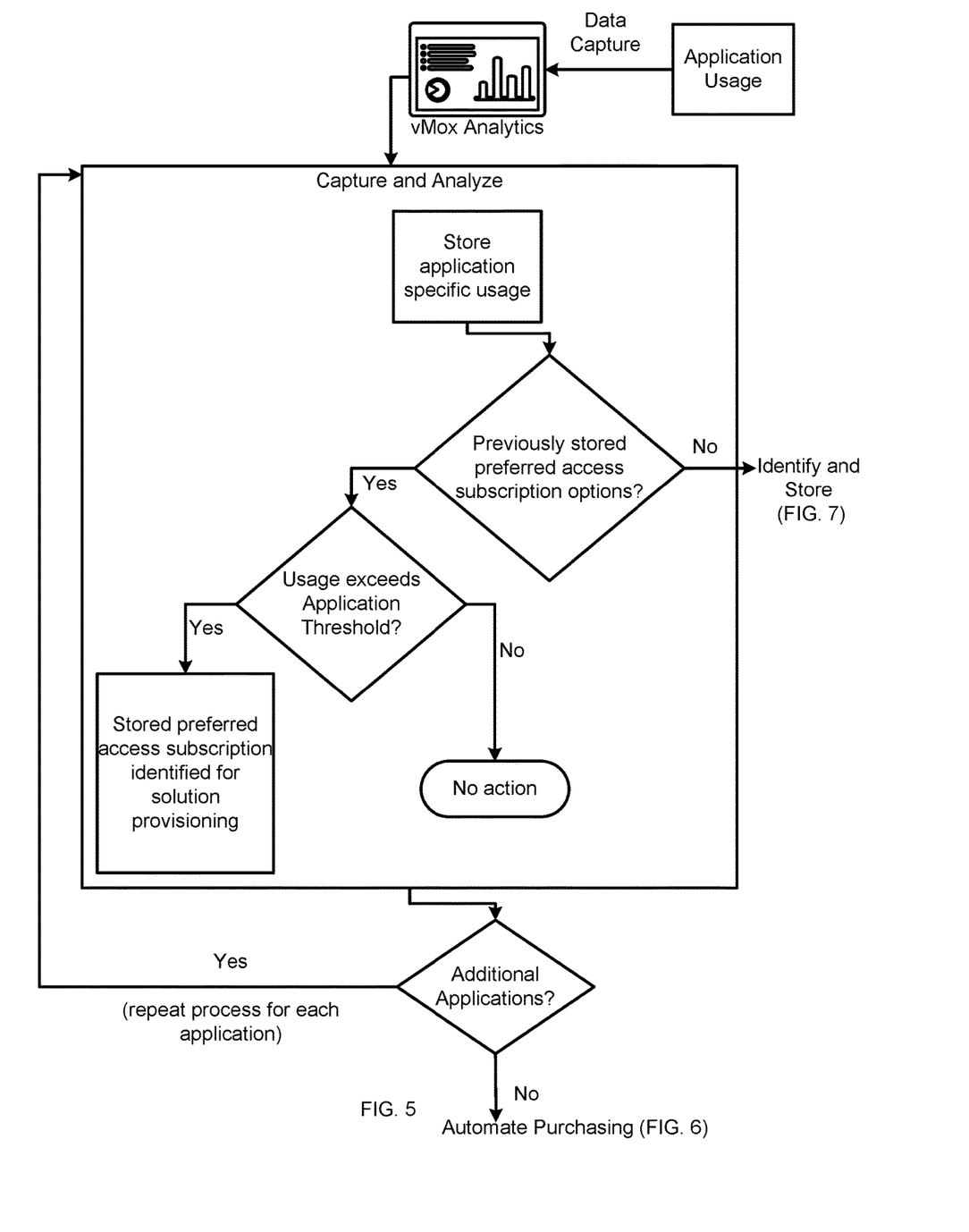
FIG. 5 depicts a flowchart for capturing and analyzing subscriber data usage according to embodiments of the present technology.
Figure 6:
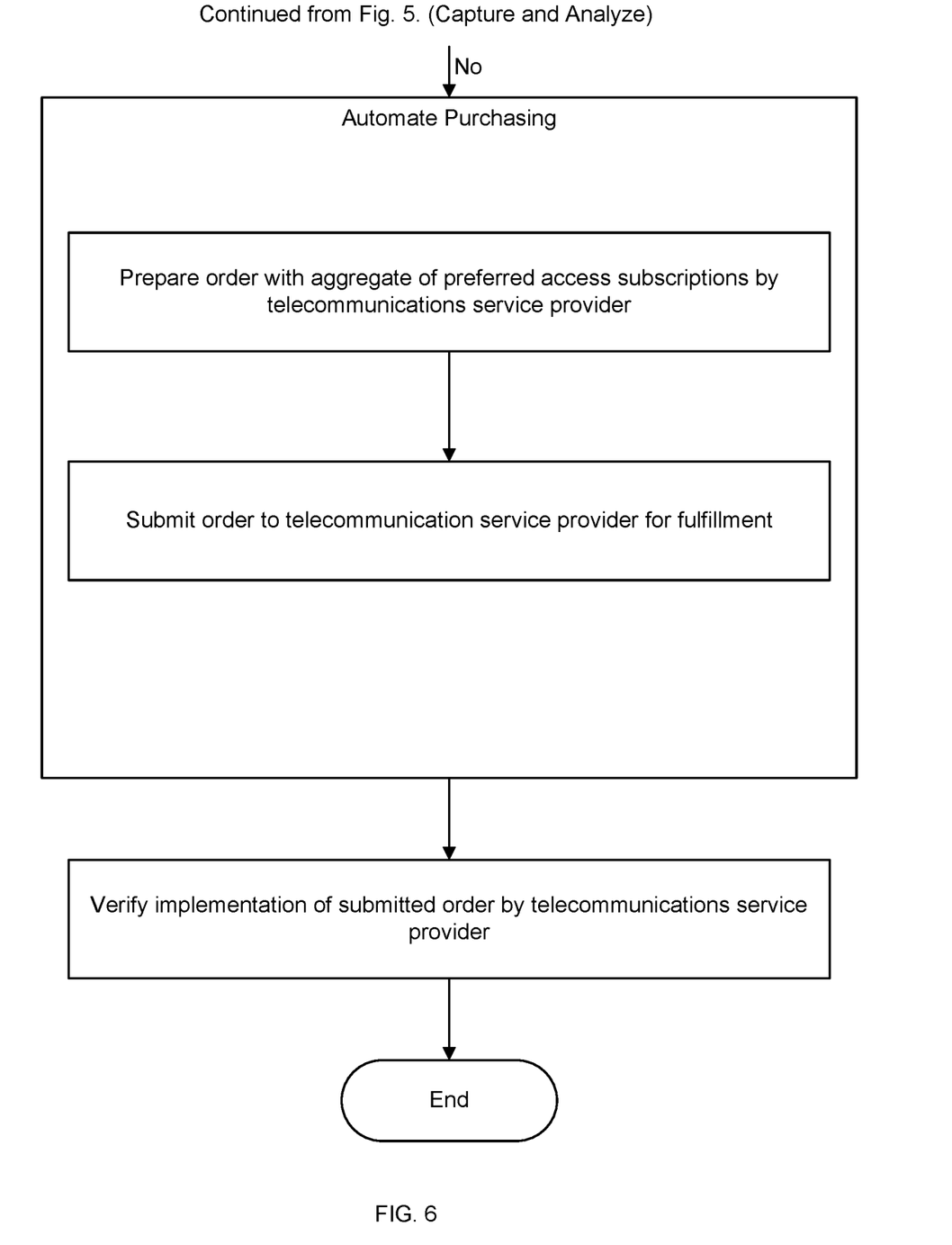
FIG. 6 depicts a flowchart for automating the purchase of features according to embodiments of the present technology.
Figure 7:
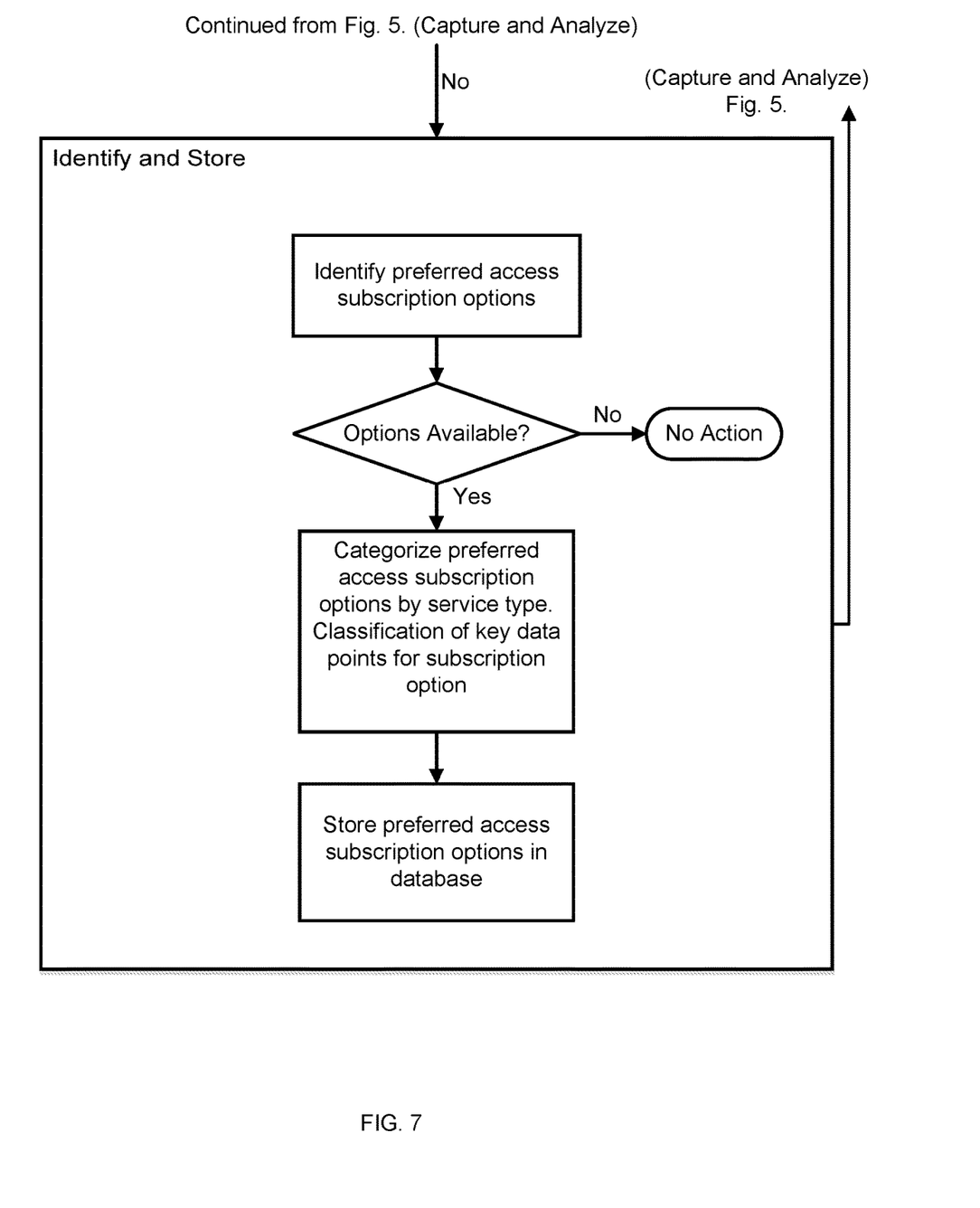
FIG. 7 depicts a flowchart for identifying and storing agreements according to embodiments of the present technology.

FIGS. 5, 6, and 7 depict a flowchart of data flow according to various embodiments of the present technology. For example application usage data is captured and analyzed using analytics to feed into the data flow of the present technology. In other exemplary embodiments, data is captured via a variety of methods including but not limited to mobile application, third party mobile device management ("MDM"), scraping, API integration, etc. In various embodiments the data flow includes capturing and analyzing subscriber data usage as shown in FIG. 5. In various embodiments the data flow continues from FIG. 5 to FIG. 6 that depicts a flowchart for automating the purchase of features according to embodiments of the present technology. In some embodiments the data flow continues from FIG. 5 to FIG. 7 that depicts a flowchart for identifying and storing agreements according to embodiments of the present technology.

Figure 8:
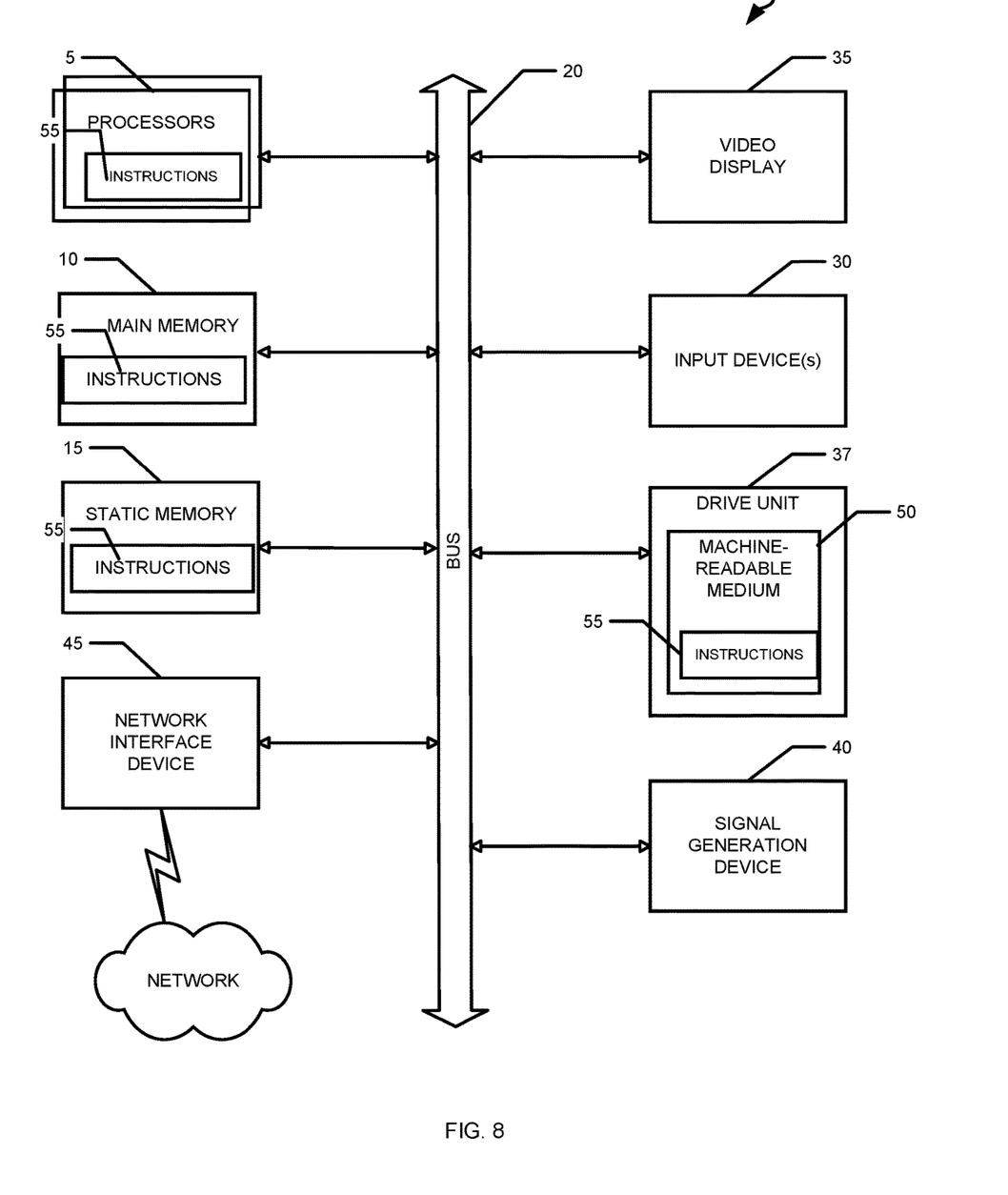
FIG. 8 illustrates an exemplary computing system that may be used to implement embodiments according to the present technology.

FIG. 8 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

Figure 9:
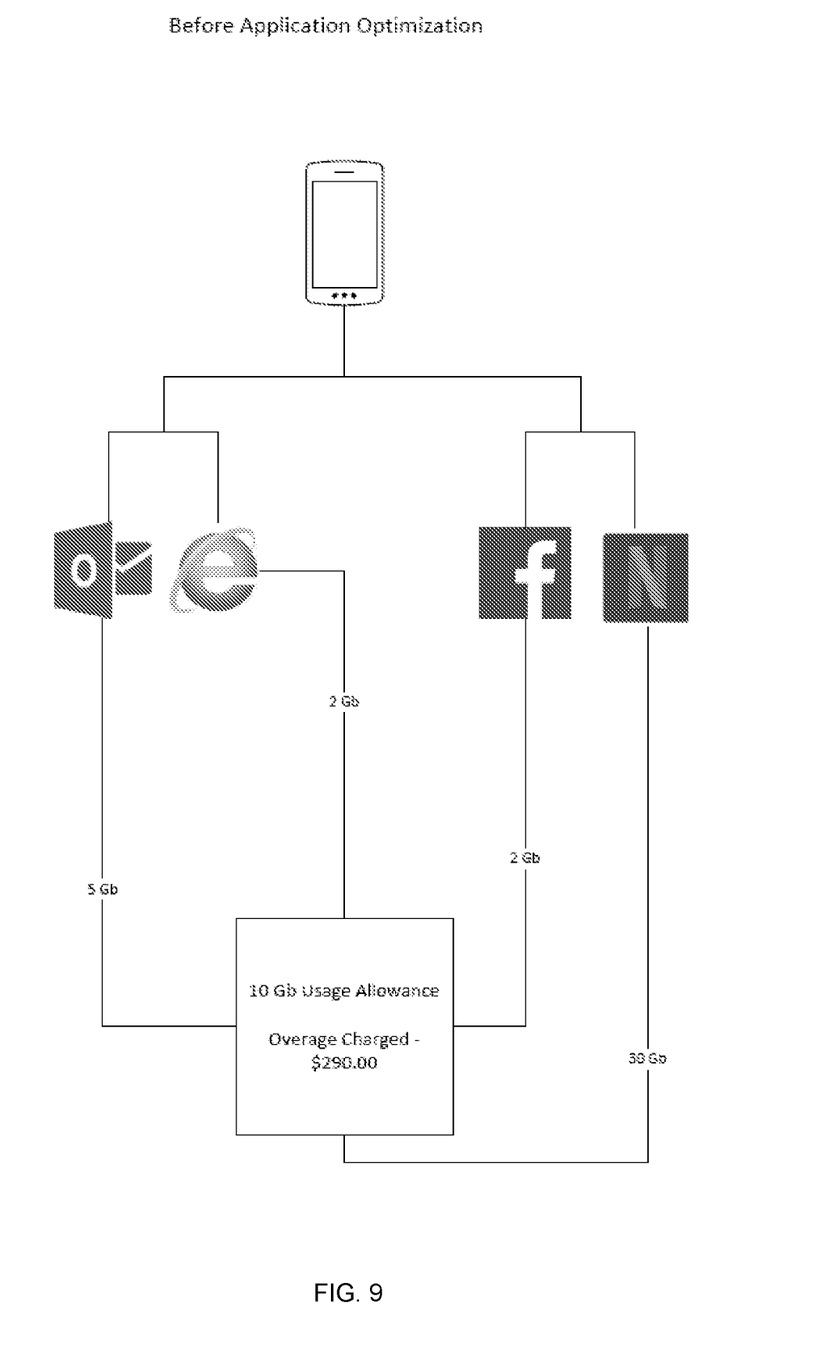
FIG. 9 illustrates an exemplary scenario before the exemplary systems and methods described and illustrated herein are applied.

FIG. 9 illustrates an exemplary scenario before the exemplary systems and methods described and illustrated herein are applied.

As shown in FIG. 9, a device had a 10 gigabyte usage allowance. As shown, one application used 5 Gbs, one application used 2 Gbs, another application used 2 Gbs, and a fourth application used 30 Gbs, resulting in a total of 39 Gbs usage, and an overage of 29 Gbs, with an overage charge of $290.00.

Figure 10:
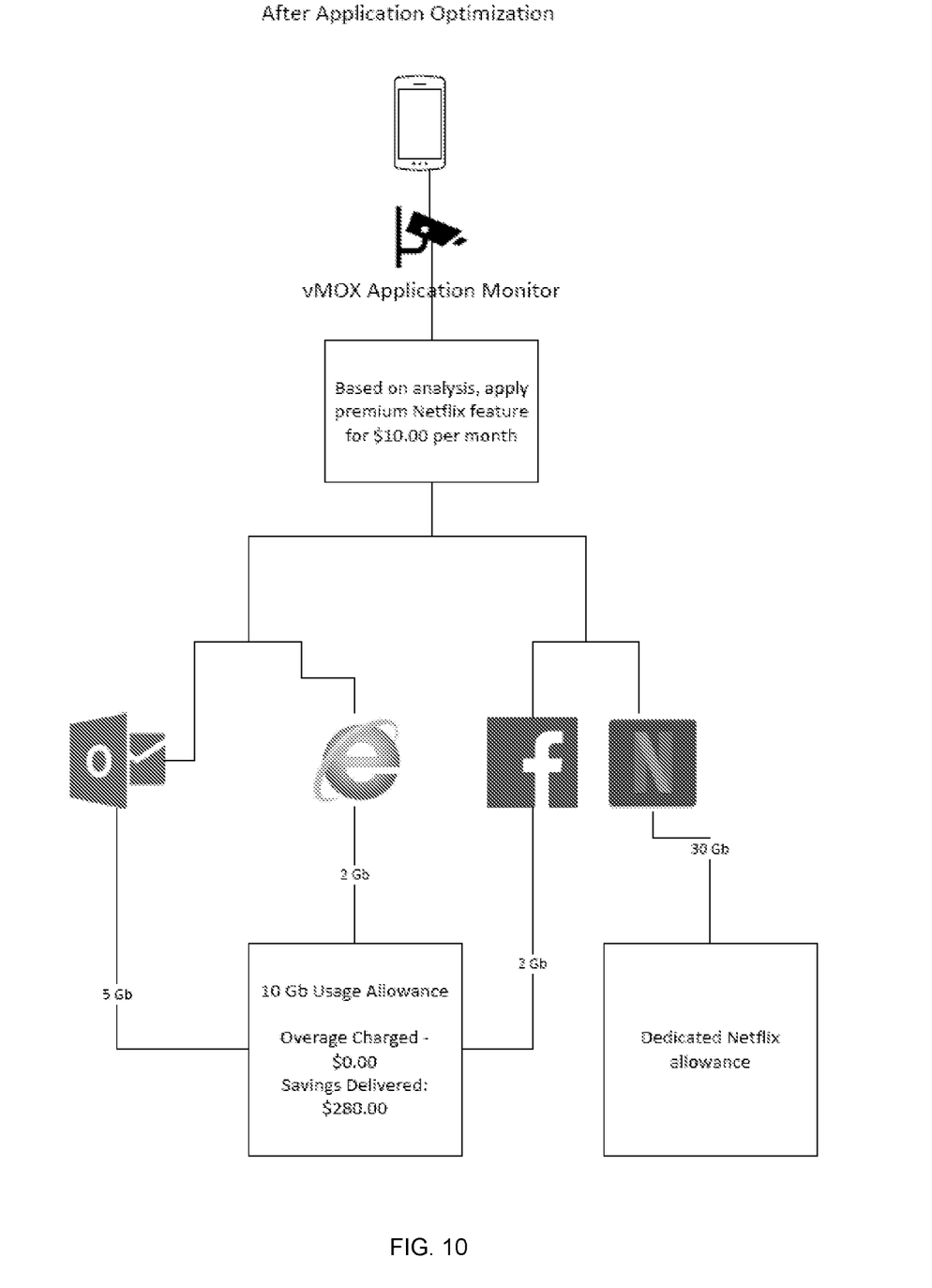
FIG. 10 illustrates an exemplary scenario after the exemplary systems and methods described and illustrated herein are applied.

FIG. 10 illustrates an exemplary scenario after the exemplary systems and methods described and illustrated herein are applied.

As shown in FIG. 10, a device had a 10 gigabyte usage allowance. According to an exemplary embodiment of the "vMOX Application Monitor," based on an analysis, the premium application feature (e.g. for Netflix), was obtained for $10.00 per month. As shown, one application used 5 Gbs, one application used 2 Gbs, another application used 2 Gbs, and a fourth application used 30 Gbs (under the premium application feature), resulting in a total of 39 Gbs usage, and an overage of 0 Gbs, with a savings of $280.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for application level usage based optimization, comprising:
   identifying and storing at least one dedicated preferred access agreement between at least one application service provided and at least one telecommunication service provided, the at least one dedicated preferred access agreement providing for dedicated access to an application provided by the at least one application service provider to a subscriber of the at least one telecommunications service provider;
   capturing and analyzing application subscriber usage for defined application services for which the at least one dedicated preferred access agreement is stored; and
   automating purchase or removal of one or more telecommunication service provider options for identified subscribers based on the stored at least one dedicated preferred access agreement and the analyzing of the application subscriber usage for the defined application services,
   the one or more telecommunication service provider options comprising an option to purchase a specified amount of usage of one or more applications in accordance with an available at least one dedicated preferred access agreement.

2. The method of claim 1, further comprising the capturing and analyzing application subscriber usage for at least one defined application service, including storing application specific usage and checking if the stored application specific usage is included in at least one previously stored preferred access subscription option.

3. The method of claim 1, wherein the automatically purchased one or more telecommunication service provider options are purchased in addition to a base telecommunication service provider plan for the identified subscribers.

4. The method of claim 1, wherein the automatically purchased one or more telecommunication service provider options are purchased instead of a base telecommunication service provider plan for the identified subscribers.

5. The method of claim 2, further comprising checking if the application subscriber usage for the at least one defined application service exceeds an application threshold.

6. The method of claim 5, further comprising: if the application threshold is exceeded, checking if at least one stored preferred access subscription is identified for solution provisioning.

7. The method of claim 6, further comprising checking if additional applications are present.

8. The method of claim 7, further comprising automating purchasing of an application if no additional applications are present.

9. The method of claim 8, further comprising preparing an order with an aggregate of preferred access subscriptions by the at least one telecommunications service provider.

10. The method of claim 9, further comprising submitting the order to the at least one telecommunications service provider for fulfillment.

11. The method of claim 10, further comprising verifying implementation of the submitted order by the at least one telecommunication service provider.

12. The method of claim 2, further comprising: if the stored application specific usage is not found in the at least one previously stored preferred access subscription option, identifying and storing the application specific usage.

13. The method of claim 12, further comprising identifying preferred access subscription options.

14. The method of claim 13, further comprising: if preferred access subscription options are available, categorizing the preferred access subscription options by service type and classifying key data points for the preferred access subscription options.

15. The method of claim 14, further comprising storing the preferred access subscription options in a database.

16. A method for application level usage based optimization, comprising:
    identifying and storing at least one dedicated preferred access agreement between at least one application service provided and at least one telecommunication service provided, the at least one dedicated preferred access agreement providing for dedicated access to an application provided by the at least one application service provider to a subscriber of the telecommunications service provider;
    categorizing the at least one dedicated preferred access agreement by service type of an application provided by the at least one application service provider; and
    storing the at least one dedicated preferred access agreement in a database.

17. A method for application level usage based optimization, comprising:
    capturing and analyzing usage of an application provided by an application service provider by at least one subscriber for at least one defined application service, wherein the captured usage of the application is analyzed by time period and subscriber end point;
    identifying relevant telecommunication service provider options available to the at least one subscriber based at least in part on the analyzed usage of the application; and
    calculating an optimal telecommunication service provider option combination, the optimal telecommunication service provider option combination comprising a subscription from the telecommunication service provider for preferred access to the at least one defined application service provided by the application service provider.

18. A method, comprising:
    automating purchase or removal of one or more telecommunication service provider options for identified subscribers, the one or more telecommunication service provider options comprising an option to purchase a specified usage allowance of one or more applications in accordance with an available at least one stored preferred access agreement;
    comparing collected usage categorization information for the identified subscribers against the at least one stored preferred access agreement between at least one application service provided and at least one telecommunication service provided, the at least one stored preferred access agreement providing for dedicated access to an application provided by the at least one application service provider to a subscriber of the telecommunications service provider;
    building recommendations to add or remove telecommunication service provider options for at least one identified subscriber to align end point usage consumption by the at least one identified subscriber with preferred access features;
    aggregating the recommendations by the end point usage consumption;
    submitting the built recommendations to the at least one telecommunication service provided for fulfillment; and
    auditing the built recommendations submitted to the at least one telecommunication service provided to confirm fulfillment by the at least one telecommunication service provided.

* * * * *